United States Patent
Reinders

(10) Patent No.: US 12,359,386 B2
(45) Date of Patent: Jul. 15, 2025

(54) ASSEMBLY OF A JACKET STRUCTURE

(71) Applicant: Siemens Gamesa Renewable Energy A/S, Brande (DK)

(72) Inventor: Mark Reinders, The Hague (NL)

(73) Assignee: SIEMENS GAMESA RENEWABLE ENERGY A/S, Brande (DK)

(*) Notice: Subject to any disclaimer, the term of this patent is extended or adjusted under 35 U.S.C. 154(b) by 166 days.

(21) Appl. No.: 17/798,485

(22) PCT Filed: Jan. 13, 2021

(86) PCT No.: PCT/EP2021/050515
§ 371 (c)(1),
(2) Date: Aug. 9, 2022

(87) PCT Pub. No.: WO2021/164953
PCT Pub. Date: Aug. 26, 2021

(65) Prior Publication Data
US 2023/0070230 A1  Mar. 9, 2023

(30) Foreign Application Priority Data
Feb. 21, 2020 (EP) .................................... 20158760

(51) Int. Cl.
*E02B 17/00* (2006.01)
*F03D 13/25* (2016.01)
*E02B 17/02* (2006.01)

(52) U.S. Cl.
CPC .......... *E02B 17/0004* (2013.01); *F03D 13/25* (2016.05); *E02B 2017/0091* (2013.01); *E02B 17/027* (2013.01); *F05B 2240/95* (2013.01)

(58) Field of Classification Search
CPC ............... E02B 17/0004; E02B 17/027; E02B 2017/0091; F03D 13/25; F05B 2240/95
See application file for complete search history.

(56) References Cited

U.S. PATENT DOCUMENTS 3,253,417 A * 5/1966 Manning ............... E02B 17/027
  52/646
3,517,516 A * 6/1970 Bea ....................... E02B 17/027
  441/29

(Continued)

FOREIGN PATENT DOCUMENTS

CN   104612449 A   5/2015
CN   104641049 A   5/2015

(Continued)

OTHER PUBLICATIONS

PCT International Search Report and Written Opinion of International Searching Authority mailed Apr. 23, 2021 corresponding to PCT International Application No. PCT/EP2021/050515 filed Jan. 13, 2021.

*Primary Examiner* — Amber R Anderson
*Assistant Examiner* — Stacy N Lawson
(74) *Attorney, Agent, or Firm* — Schmeiser, Olsen & Watts LLP

(57) ABSTRACT

Assembling a jacket structure that includes two or more legs and crossing braces extending between the legs and forming cross joints. A first component of the jacket structure includes two or more legs and brace structures. Each brace structure includes a first brace and a second brace, sections of the first and second braces being at one end attached to the first leg at respective first and second leg-brace joints. The brace structure and the first leg form an A-frame. A second component of the jacket structure that includes a second set of brace structures and a second part of the brace cross node is further provided. The first component of the jacket structure is mounted to the second component of the jacket structure by joining the first and second parts of the brace cross nodes to form full brace cross nodes.

12 Claims, 7 Drawing Sheets

(56) References Cited

U.S. PATENT DOCUMENTS

| | | | |
|---|---|---|---|
| 2012/0263544 A1 | 10/2012 | Oestergaard et al. | |
| 2013/0177445 A1 | 7/2013 | Stiesdal | |
| 2015/0107181 A1* | 4/2015 | Larsen | E04H 12/10 52/655.1 |
| 2015/0152664 A1* | 6/2015 | Larsen | E04H 12/10 52/651.07 |
| 2018/0038060 A1* | 2/2018 | Uiyyasathian | E02B 17/0004 |
| 2020/0340199 A1* | 10/2020 | Nyvang | F03D 13/25 |

FOREIGN PATENT DOCUMENTS

| | | |
|---|---|---|
| CN | 110306859 A | 10/2019 |
| EP | 2360318 A2 | 8/2011 |
| EP | 2511423 A1 | 10/2012 |
| EP | 2511424 A1 | 10/2012 |
| EP | 2534313 A1 | 12/2012 |
| EP | 2534314 A1 | 12/2012 |
| EP | 2536881 A1 | 12/2012 |
| EP | 2582882 A2 | 4/2013 |
| EP | 2877642 A1 | 6/2015 |
| EP | 3508653 A1 | 7/2019 |
| EP | 3076013 B1 | 11/2019 |
| JP | S 58176312 A * | 10/1981 |
| JP | 2006348738 A | 12/2006 |
| JP | 2012225152 A | 11/2012 |
| JP | 2013534583 A | 9/2013 |
| KR | 20140003834 A | 1/2014 |
| KR | 20140077334 A | 6/2014 |
| TW | M379656 U | 5/2010 |
| TW | 201930717 A | 8/2019 |
| WO | 2011147474 A1 | 12/2011 |
| WO | 2011147476 A1 | 12/2011 |
| WO | 2011147480 A2 | 12/2011 |
| WO | 2011147482 A1 | 12/2011 |
| WO | 2011147484 A1 | 12/2011 |
| WO | 2011147592 A1 | 12/2011 |
| WO | 2011160703 A2 | 12/2011 |
| WO | 2012165970 A1 | 12/2012 |
| WO | 2013156110 A1 | 10/2013 |
| WO | 2013185769 A1 | 12/2013 |
| WO | 2013185770 A1 | 12/2013 |
| WO | 2019137874 A1 | 7/2019 |

\* cited by examiner

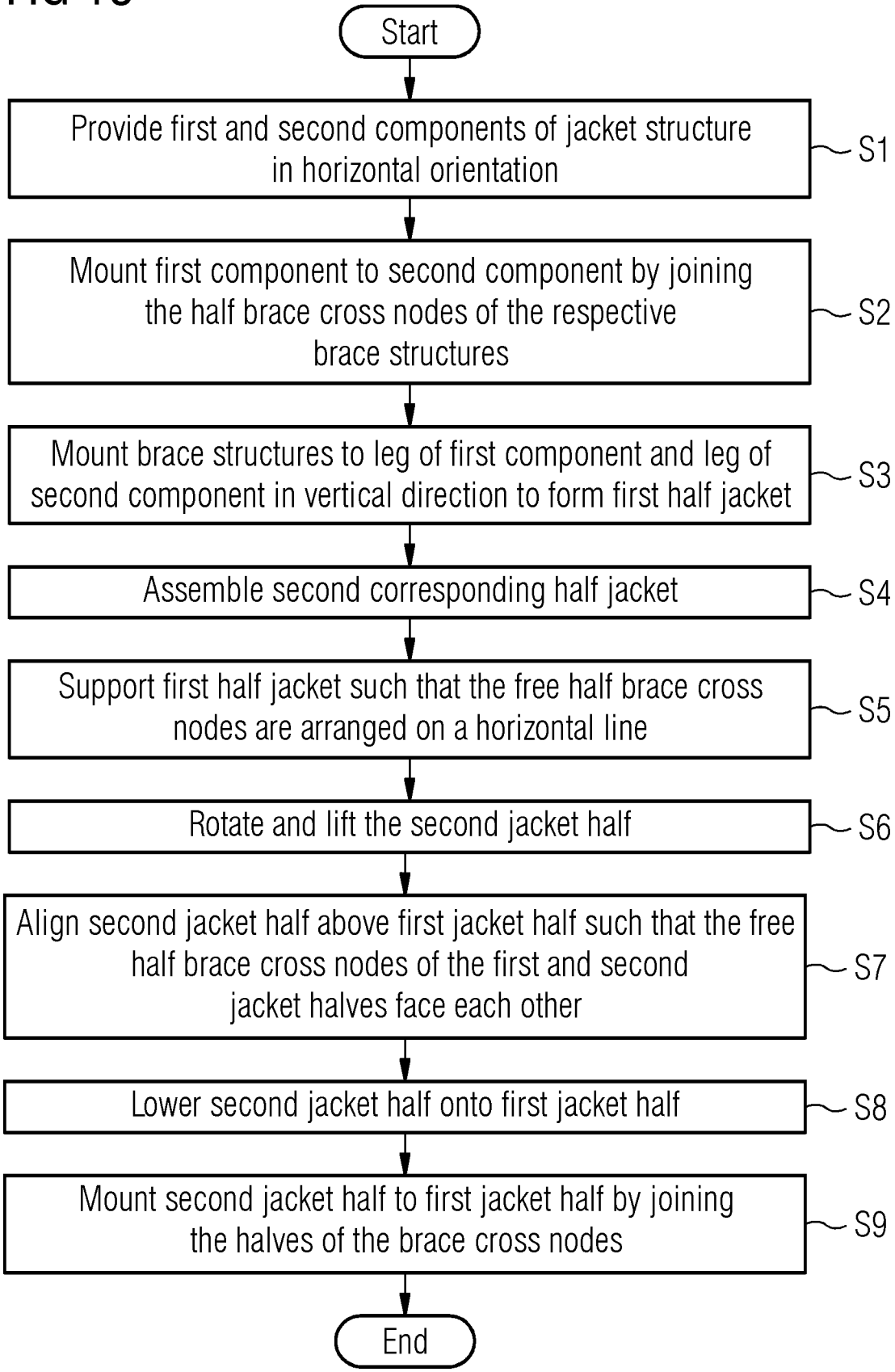

ASSEMBLY OF A JACKET STRUCTURE

CROSS-REFERENCE TO RELATED APPLICATIONS

This application claims priority to PCT Application No. PCT/EP2021/050515, having a filing date of Jan. 13, 2021, which claims priority to EP Application No. 20158760.7, having a filing date of Feb. 21, 2020, the entire contents both of which are hereby incorporated by reference.

FIELD OF TECHNOLOGY

The following relates to a method of assembling a jacket structure that includes two or more legs and plural crossing braces. It further relates to a jacket structure component and to a jacket structure comprising two or more of such components. The following further relates to a wind turbine that includes a jacket structure as support.

BACKGROUND

To increase energy production from renewable sources, wind turbines are being installed offshore. Such wind turbines need a suitable support, and it is known to use monopiles and gravity structures as a foundation for supporting such offshore wind turbines. These are suitable for the shallow water region, in water depths of up to thirty meters. In deep water regions, where water depths exceed fifty meters, floating structures are mostly used to support the turbines. In transitional water regions, jacket structures can be used as support. Such jacket structure may also be termed lattice tower. Other offshore installations can be supported on such jacket structure, such as oil and gas producing facilities, collector substations (e.g. for collecting power from several individual wind turbines) and other types of offshore platforms.

A particular advantage of using such jacket structures is that waves and currents have relatively low impact compared to other structures such as monopiles. On the other hand, such jacket structures are relatively large structures that require extensive resources for assembly and preparation. Furthermore, erecting jacket structures requires large scale equipment, such as cranes and welding equipment, and further requires a good infrastructure to transport these structures from a manufacturing facility to a transport site, such as a harbor, before these structures can be shipped out to their intended location.

An example of a jacket structure that includes legs, braces and node elements for joining the braces to the legs is described in the document EP 2 511 423 A1. The solution provides node-to-leg and/or brace-to-node connections in form of an adhesive joint to facilitate assembly.

It is desirable to further facilitate assembly and manufacture of such jacket structures. Furthermore, it is desirable to facilitate the transport of such structures to a transport site at which the jacket structure can be fully assembled.

SUMMARY

There is accordingly a need to improve the assembly of such jacket structures. It is furthermore desirable to improve the transportation of such jacket structures.

According to an embodiment of the invention, a method of assembling a jacket structure that includes two or more legs and plural crossing braces extending between the legs and forming cross joints is provided. The method comprises providing a first component of the jacket structure that includes a first of the two or more legs and that further includes a first set of brace structures. Each brace structure includes a section of a first brace and a section of a second brace. The sections of the first and second braces are at one end attached to the first leg at respective first and second leg-brace joints. The first and second leg brace joints are spaced apart. At their other end, the sections of the first and second braces are joined to each other so as to form a first part, in particular a half, of a brace cross node. The brace structure and the first leg thereby form an A-frame. The method further includes providing a second component of the jacket structure that includes a second set of brace structures, wherein each brace structure of the second set includes at least a section of a first brace and a section of a second brace which are joined at one end so as to form a second part, in particular a half, of a brace cross node. The first component of the jacket structure is then mounted to the second component by joining the first and second parts of the brace cross nodes to form full brace cross nodes in such a way that the sections of the braces of the first and second sets of brace structures form braces which are crossing at the respective brace cross node.

By such method, assembly of the jacket structure can be facilitated significantly. The first and second components can for example be provided as pre-assembled components. They may thus be transported relatively easily due to their reduced size. Furthermore, at a transport site, the components can be mounted together in a fast and efficient way by simply joining the parts of the brace cross nodes. It is thus not required to individually connect four different brace sections to a common joint, which can be a complex and time-consuming task since several connections have to be established and due to the required alignment. Further, as the braces are conventionally provided separate from the legs, the brace to node and node to leg connections may need to be established to attach the braces to the respective leg. According to the method, this can be avoided by providing the first and second components that can be pre-assembled and that are relatively easy to join.

The first and second parts of the brace cross nodes can be complementary parts. They may be halves, yet the brace cross nodes may also be divided into unequal parts. The first and second parts of the brace cross nodes are similar or (substantially) identical in structure, in particular mirror-symmetric. A set of brace structures may include 1, 2, 3, or more brace structures. Neighboring brace structures that from an A-frame on the first leg may share a leg-brace joint, in particular a leg-brace node.

When mounting the first component to the second component, the brace structures of the first set and the brace structures of the second set may be joined pairwise by joining their respective first and second parts of the brace cross nodes. For example, by joining three such node parts, a stable structure is already achieved that includes six crossing braces.

In an embodiment, in the first set of brace structures and in the second set of brace structures, the angle of the sections of the first and second braces may be chosen such that when the first and second parts of the brace cross nodes are joined, brace sections lying on opposite sides of the respective brace cross node form the same angle with the first leg. Such brace sections lie on the same straight line. Accordingly, a through-going brace that reaches from a first leg to, e.g., a second leg of the second component may be formed in a simple way. The structure thus stabilizes the jacket and transmits forces efficiently. It should be clear that not all of the brace sections may form respective straight braces, but some brace sections of the first and second sets may be angled with respect to each other.

When the first and second components of the jacket structure are joined, the first and the second components may be arranged (substantially) horizontally, in particular in a horizontal plane. The joining of the parts of the brace cross nodes can thus be performed at ground level by assembly workers, which enhances work safety.

In an embodiment, the first part and/or the second part of the brace cross node comprises a mounting element, in particular a plate, for example a rectangular plate. The ends of the brace sections of the first and second braces of the respective brace structure are attached to the mounting element. Such mounting element, in particular such plate, allows a fast and simple joining of the two parts of the brace cross node. The mounting element of each part may for example form a flange, and the flanges of the first and second parts may be joined to form the full brace cross node.

In general, different ways of joining the first and second parts of the brace cross node may be employed. Examples include welding, bolting, riveting, using an adhesive or the like. Using a respective flange or plate makes it particularly easy to employ different means of joining the first and second parts of the brace cross node.

The first and second part of the brace cross node may further comprise a first connecting piece, in particular a stub or sleeve, attached to the respective section of the first brace and a second connecting piece, in particular a stub or sleeve, attached to the respective section of the second brace. The first and second connecting pieces may for example extend in a V-shape from the same side of the mounting element, in particular the plate. For example, each brace section may be attached to a stub of the brace cross node part by welding, e.g. orbital welding. The V-shape may be arranged symmetrical and perpendicular to the surface of the plate, i.e. the first and second stubs may extend at corresponding angles to the normal of the plate surface. Asymmetric configurations in which the first and second stubs extend at different angles to the normal are certainly conceivable; these are in particular employed when crossing braces extend at different angles from the legs of the jacket. Alternatively, the brace sections may be directly welded or bolted to the mounting element without employing respective connecting pieces.

In some embodiments, the second component including the second set of brace structures can be an intermediate component not comprising a leg. It may for example include cross brace sections that are at both their respective ends joined pairwise by a respective part of the brace cross node. Such joined and crossing brace sections then form rhombus-shaped intermediate frames. A third component corresponding to the first component may then be mounted on the other side of such intermediate component.

The second component of the jacket structure includes a second of the two or more legs. For each brace structure of the second set, the sections of the first and second braces may at their respective other end be attached to the second leg at respective leg-brace joints (in particular nodes) that are spaced apart. Each brace structure of the second set and the second leg thereby forms an A-frame. Accordingly, the second set of brace structures and the first set of brace structures may have a corresponding or even the same configuration.

The brace structures of the first set may extend in a first plane, in particular a horizontal plane, and the method may further comprise mounting to the first leg a third set of brace structures extending in a different second plane.

Additionally or alternatively, the brace structures of the second set may extend in the first plane, and the method may further include mounting to the second leg a fourth set of brace structures extending in a different third plane. It should be clear that the third and/or fourth sets of brace structures may be mounted prior to mounting the first component to the second component, yet they are mounted thereafter. The brace structures of the third and fourth sets may have a configuration corresponding to the one of the brace structures of the first set. Each brace structure of the third set may in particular comprise a respective part of a brace cross node and may form an A-frame with the first leg. The same applies to the fourth set of brace structures with respect to the second leg. However, it should be clear that the braces of the third/fourth sets may have a different length, angle, and/or thickness than the braces of the first and second sets. Their structural configuration is similar or the same.

The brace structures of the third and fourth sets may for example be provided as pre-assembled V-frames, i.e. as two brace sections that are joined at a respective part of a brace cross node. These may then be mounted to the respective leg to form an A-frame. They may be mounted to the leg at the same leg-brace joints (in particular nodes) as the first/second sets of brace structures.

The second and third plane may enclose an angle of about 90-110 degrees with the first plane (in particular for a four leg jacket). The angle generally depends on the number of legs of the jacket structure and the amount of tapering (i.e. the difference in width between top and bottom parts of the structure). In other embodiments, the angle between the second/third plane and the first plane may be about 60-80 degrees (e.g. for a three leg jacket).

Mounting the V-frames prior to joining the first and second components has the advantage that a component that is pre-assembled to a large extent (that in particular corresponds to a quarter of the jacket) can be provided, which can easily be joined to one or more corresponding components, thereby assembling the jacket structure in a fast and efficient way. Mounting the V-frames after combining the first and second components has the advantage that a pre-assembled component having a smaller transport size can be provided, and that the assembly is relatively simple, since the V-frames can be mounted at ground level.

The first component and the second component of the jacket structure may form a first half of the jacket structure. The method may further include the providing of a second half of the jacket structure that has a structure corresponding to the structure of the first half; it may in particular be assembled as outlined herein above. The second half of the jacket structure may then be aligned with the first half such that the parts of the brace cross nodes of the third and fourth sets face corresponding parts of brace cross nodes of the second half. The parts of the brace cross nodes of the first and second halves may than be joined together to thereby mount the second half to the first half of the jacket structure.

The work for joining both halves can take place at a height corresponding to half the width of the horizontally arranged jacket structure, since only the parts of the brace cross nodes need to be joined. This is a significant advantage over conventional methods, where individual legs and braces need to be mounted at larger heights (corresponding to the full width of the jacket structure), so that the present method provides improved safety for the assembly workers.

For example, one or two cranes may be used to pick up and rotate the second half and to align the second half above the first half. The second half may then be lowered down onto the first half such that the opposing parts of the brace cross nodes meet.

Prior to the aligning, the first half may be arranged such that the parts of the brace cross nodes of the third brace structures face upward and are arranged along a substantially horizontal line, in particular by supporting the first and second components above ground. This is particularly beneficial for jacket structures that have a wider base and a smaller top, i.e. that are tapered. The second half can then rest on the first half without sliding.

In another embodiment, a third component of the jacket structure may be provided and may comprise at least a third of the two or more legs and further a fifth set of brace structures extending from the third leg in a fourth plane. The third component may then be aligned such that the fifth set of brace structures is aligned with the third set of brace structures (i.e. the second and the fourth planes may coincide). The third component may then be mounted to the first component by joining the parts of the brace cross nodes of the fifth and the third sets of brace structures. If the jacket structure is a four-leg structure, three quarters of the structure can thus be assembled fast and efficiently. The third component may in particular comprise a sixth set of brace structures extending in a plane at an angle to the fourth plane, for example at 90-110 degrees for a four-leg jacket (depending on the degree of tapering). For a three-leg jacket, the angle may be about 60-80 degrees, and the brace structures of the sixth set of the third component may be joined to the brace structures of the fourth set of the second component, thereby assembling a three-leg jacket structure.

In an embodiment, the method further comprises providing a fourth component of the jacket structure, wherein the fourth component comprises a fourth of the two or more legs and further comprises a seventh set of brace structures and an eighth set of brace structures. These seventh and eighth sets of brace structures may extend in respective planes that are angled at 90-110 degrees to each other. The fourth component is aligned such that the brace structures of the seventh set face the brace structures of the sixth set of the third component, and that the brace structures of the eighth set face the brace structures of the fourth set of the second component. The fourth component may than be mounted to the jacket structure by joining the parts of the brace cross nodes of the brace structures that face each other (i.e. the sixth and seventh sets, and the eighth and fourth sets).

Accordingly, by employing respective pre-assembled third and fourth components of the jacket structure, the first jacket structure can be assembled in a fast and efficient way. This is particularly beneficial for cases where the jacket structure is so large and heavy that it is not feasible to lift one half of the jacket structure with one or two cranes. The weight of the jacket structure may for example exceed 100 tons and may be in the range of 200 tons or more. For example when assembling a four-leg jacket structure, one half of which exceeds a weight of 100 or 150 tons, the use of pre-assembled quarters, i.e. the third and fourth components, may be preferred. In particular, at least the third and fourth components, and possibly also the first and second components, may be provided as pre-assembled quarters of the jacket structure.

The first leg (and the other legs) may have a height direction, and in the height direction of the first leg, the distance of the first part of the brace cross node to the first leg degreases for subsequent brace structures (i.e. for subsequent A-frames). A tapering jacket structure can thus be provided which is wider at the bottom and narrower at the top. The configuration may be similar for the other components (second, third, fourth etc.).

It should be clear that other jacket structures can be assembled in a corresponding way, i.e. the methods described herein may be used to assemble a jacket structure having 5, 6 or more legs. The angles between sets of brace structures on the same leg may vary accordingly.

According to a further embodiment of the invention, a jacket structure component for forming a jacket structure that includes two or more legs and plural crossing braces extending between the legs and forming cross joints is provided. The jacket structure component comprises a first of the two or more legs and a first set of brace structures, wherein each brace structure includes a section of a first brace and a section of a second brace, the sections being at one end attached to the first leg at respective first and second leg-brace joints. The sections of the first and second braces are at their other end joined to each other so as to form a first part of a brace cross node. The brace structure and the first leg thereby form an A-frame. The set of brace structures may for example include one, two, three, four or more brace structures. By such jacket structure component, advantages similar to the ones outlined further above may be achieved.

The jacket structure component may further comprise a second set of brace structures having a corresponding configuration, wherein the brace structures of the first set lie in a first plane and the brace structures of the second set lie in a second plane, wherein the second plane is angled with respect to the first plane. Depending on the type of jacket structure (e.g. the number of legs) and the tapering, the angle may for example be between thirty and one hundred thirty degrees, preferably between 60 and 110 degrees. The first and second planes may intercept at the first leg, i.e. the first leg may lie within both the first and second planes. Again, as mentioned above, the braces of the first and second sets may have a different diameter, length and angle, yet they are the same. Also, the brace structures of the first and second sets may use the same leg-brace nodes for attachment to the first leg, e.g. double K-nodes. In other embodiments, they may use different nodes, the nodes of the first set being for example shifted with respect the nodes of the second set of brace structures.

In an embodiment, wherein the first part of the brace cross node comprises a mounting element, in particular a plate, for mounting the first part to a complementary second part of the brace cross node. The first part may further comprise a first connecting piece, in particular a stub or sleeve, attached to the respective section of the first brace and a second connecting piece, in particular a stub or sleeve, attached to the respective section of the second brace. The first and second connecting pieces may be attached to the mounting element. They may in particular extend in a V-shape from the same side of the mounting element, in particular from the plate. The mounting element may form a flange that allows easy attachment to a corresponding part of a brace cross node of another component. Again, the V-shape may not be symmetrical, in particular when the jacket structure has a tapered shape.

According to a further embodiment of the invention, a jacket structure comprising at least two jacket structure components in any of the above described configurations is provided. The jacket structure components are arranged such that brace structures of the two or more jacket structure components face each other. The two or more jacket structure components are mounted to each other by joining the parts of the brace cross nodes of facing brace structures to form full brace cross nodes. A jacket structure that is stable and that is assembled from separate pre-assembled components that are easily transportable can thus be obtained.

A jacket structure is in particular a structure formed by 3, 4, 5, or more supporting legs and a lattice framework extending between these supporting legs, the lattice framework being formed by the respective braces.

According to a further embodiment, a wind turbine including a support structure is provided. The support structure comprises a jacket structure in any of the configurations described herein. The wind turbine may in particular be an offshore wind turbine.

It should be clear that the jacket structure component and the jacket structure may include any of the features described above with respect to the assembly method, and may in particular be assembled by any such method and thus exhibit the respective structural features.

It is to be understood that the features mentioned above and those yet to be explained below can be used not only in the respective combinations indicated, but also in other combinations or in isolation, without leaving the scope of embodiments of the present invention. In particular, the features of the different aspects and embodiments of the invention can be combined with each other unless noted to the contrary.

BRIEF DESCRIPTION

Some of the embodiments will be described in detail, with reference to the following figures, wherein like designations denote like members, wherein:

FIG. 13 is a schematic flow diagram illustrating a method according to an embodiment of the invention.

DETAILED DESCRIPTION

Figure 1:
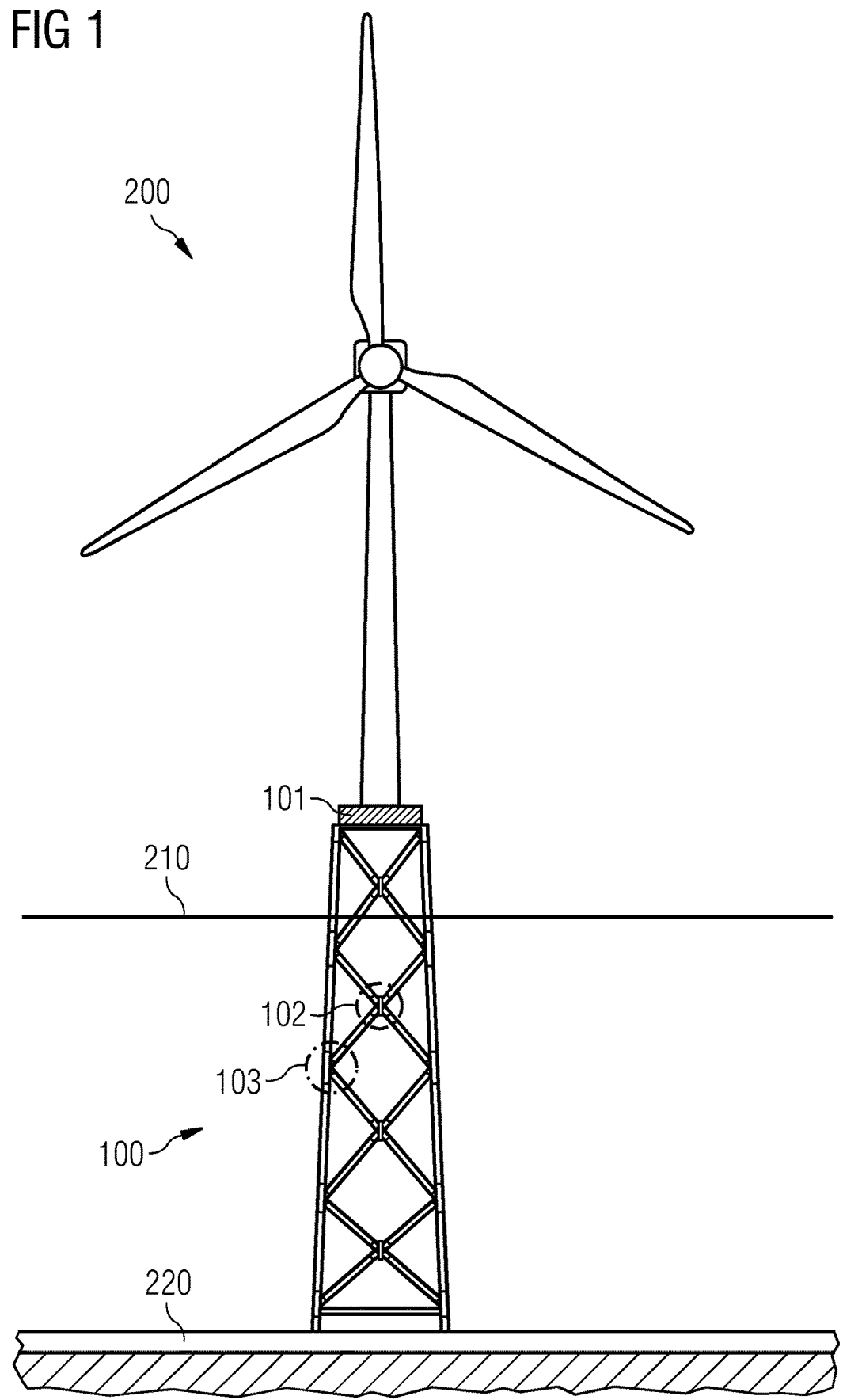
FIG. 1 is a schematic drawing showing a wind turbine including a jacket structure according to an embodiment of the invention.

In the following, embodiments of the invention will be described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the art. As used herein, the singular forms "a," "an," and "the" are intended to include the plural forms as well, unless the context clearly indicates otherwise. The terms "comprising," "having," "including," and "containing" are to be construed as open-ended terms (i.e., meaning "including, but not limited to,") unless otherwise noted.

FIG. 1 is a schematic drawing showing an offshore wind turbine 200 that is mounted to a support structure which includes a jacket structure 100. The jacket structure 100 is installed on sea floor 220 and penetrates the water surface 210, and it may include a transition piece 101 to which the wind turbine is mounted. The respective jacket structure 100 can also be used for supporting other loads, such as an offshore platform, which may for example include oil or gas producing facilities or collection substations.

A jacket structure according to an embodiment may include three, four or more legs which when deployed are supported on the ocean floor. Neighboring legs are interconnected by a mesh of braces. Legs and/or braces of such jacket structure may be made of steel pipes or pipe sections, steel beams or the like. As shown in FIG. 1, the braces can form cross joints 102 where they cross. They may be connected to each other by means of a brace cross node. The braces are further joined to the legs at K-joints 103. Such joint may be provided by directly welding or bolting the braces to the leg or by using a leg-brace node. The jacket structure my thus comprise a leg-to-node connection between each node element and leg, and a brace-to-node connection between each brace and node element. The jacket structure can be tapered, i.e. it can be narrow at the top and becoming wider towards the base to provide the necessary structural stability. The base of the jacket structure can be anchored to a concrete foundation on the seabed, or each leg of the jacket structure can be secured to a separate pile driven into the seabed. Each leg may also be attached to a suction bucket to secure the structure into the sea bed. Joints 103 may in particular be double K-joints (as braces extend towards one leg in one direction and towards another leg in a perpendicular direction). It should be clear that other types of joints and connection principles are known and may be employed for connecting the braces to the legs of the jacket structure.

Figure 2:
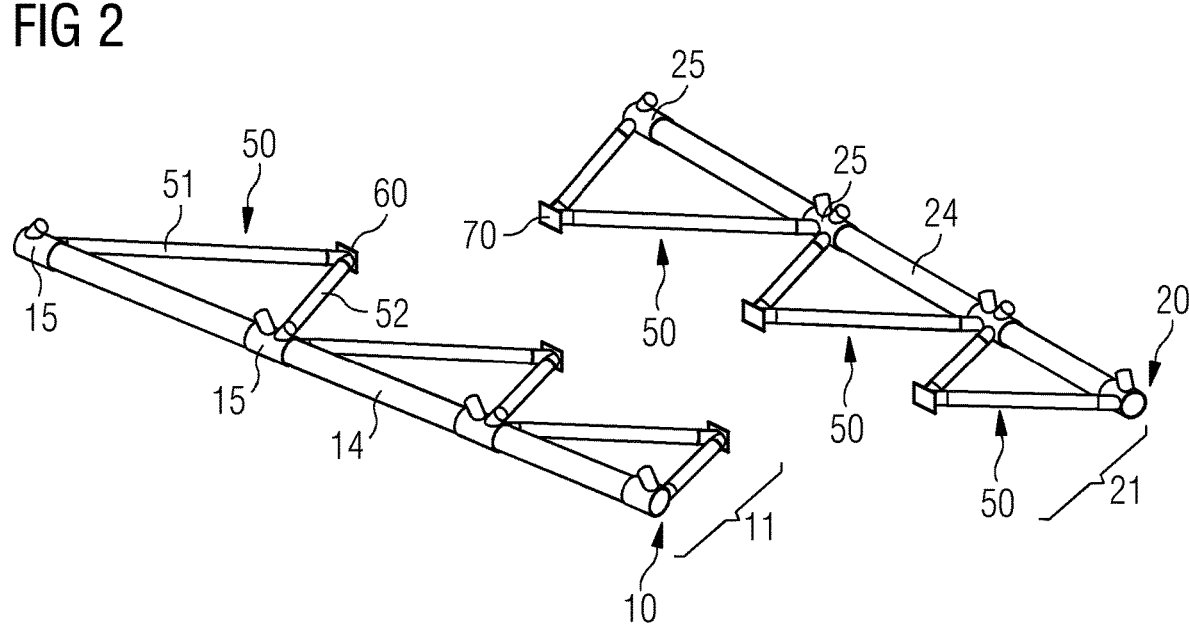
FIG. 2 is a schematic drawing showing two components of a jacket structure according to an embodiment of the invention.

In accordance with embodiments of the present invention, a method of assembling such jacket structure and respective jacket structure components are provided. Such method, components, and jacket structure are described hereinafter with respect to FIGS. 2 to 13. The method is illustrated in the flow diagram of FIG. 13 and includes the providing of first and second components 10, 20 of the jacket structure 100 in a horizontal orientation (step 51). This is shown in FIG. 2. The first component 10 includes a first set 11 of brace structures 50. In the present example, three such brace structures 50 are shown, yet it should be clear that each component may include more or fewer brace structures 50. Each brace structure includes a section of a first brace 51 and a section of a second brace 52 which are joined at one of their ends at a part 60 of a brace cross node. The two sections of the two braces 51, 52 thus essentially form a V-frame. The part 60 of a brace cross node is essentially one half of such node and may also be termed split cross node or split X-node. At their respective other ends, the sections of the first and second braces 51, 52 are attached to a first leg 14 of the first component 10. This may occur via respective first and second leg-brace nodes 15, which are accordingly spaced apart. The first leg 14 and the brace structure 50 thus form an A-frame. Plural of such frame structures 50 are provided, and plural A-frames are accordingly formed along the first leg 14. If the tower is tapered, the distance from the first leg 14 to the part 60 of the brace cross node is larger for the brace structures located towards the bottom of the leg and smaller for brace structures located towards the top thereof. The leg-brace nodes 15 can be formed as sleeves mounted to the leg 14, wherein stubs for being welded to the respective brace sections extend in a V-shape away from the sleeve.

The second component 20 includes a second set 21 of brace structures 50, the brace sections of which are joined at respective second parts 70 of a brace cross node. The configuration of the second component 20 corresponds to the one of the component 10; it is essentially mirror-symmetric to the component 10. When the first part 60 and second part 70 of the brace cross node are joined, they will form a full brace cross node 80 and thereby connect the sections of the first and second braces 51, 52. Accordingly, when assembling the second component 20 to the first component 10, only the first and second parts 60, 70 of the brace cross nodes need to be joined (pairwise for opposing brace structures 50). As can be seen in FIG. 2, the assembly can occur in a horizontal plane and thus on ground level.

Figure 3:
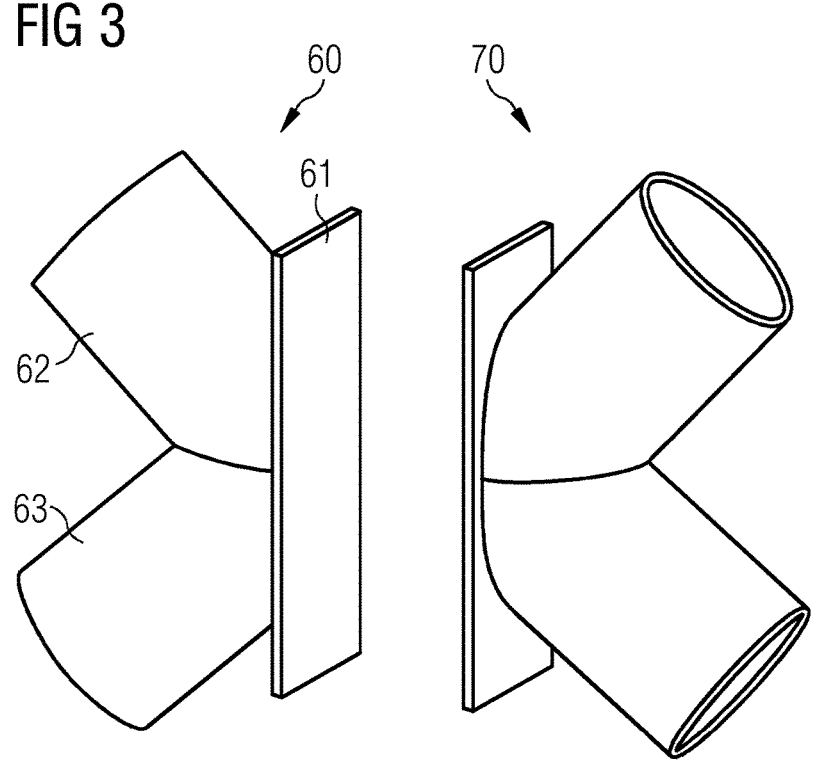
FIG. 3 is a schematic drawing showing two parts, in particular halves, of a brace cross node according to an embodiment of the invention.

FIG. 3 schematically shows the parts 60 and 70 of a split brace cross node according to an embodiment. As can be seen, the part 60 of the brace cross node includes a mounting element 61, in particular a plate, to which two connecting pieces 62, 63, in particular stubs, are attached. The stubs 62, 63 extend in a V-shape from one side of the plate 61. The brace sections may be welded to these stubs 62, 63, e.g. using orbital welding. In other embodiments, the brace sections may be directly welded to the plate 61, i.e. no stubs may be provided. The second part 70 is configured correspondingly; it is in particular mirror-symmetric to the first part 60. Plate 61 provides a flange by means of which the two parts 60, 70 can be easily joined using different joining methods. For example, the plates 61 may be welded or bolted together for joining the two parts of the brace cross node. Such split node provides a clean and simple flanged plate interface which is flexible towards the method of fastening.

Figure 4:
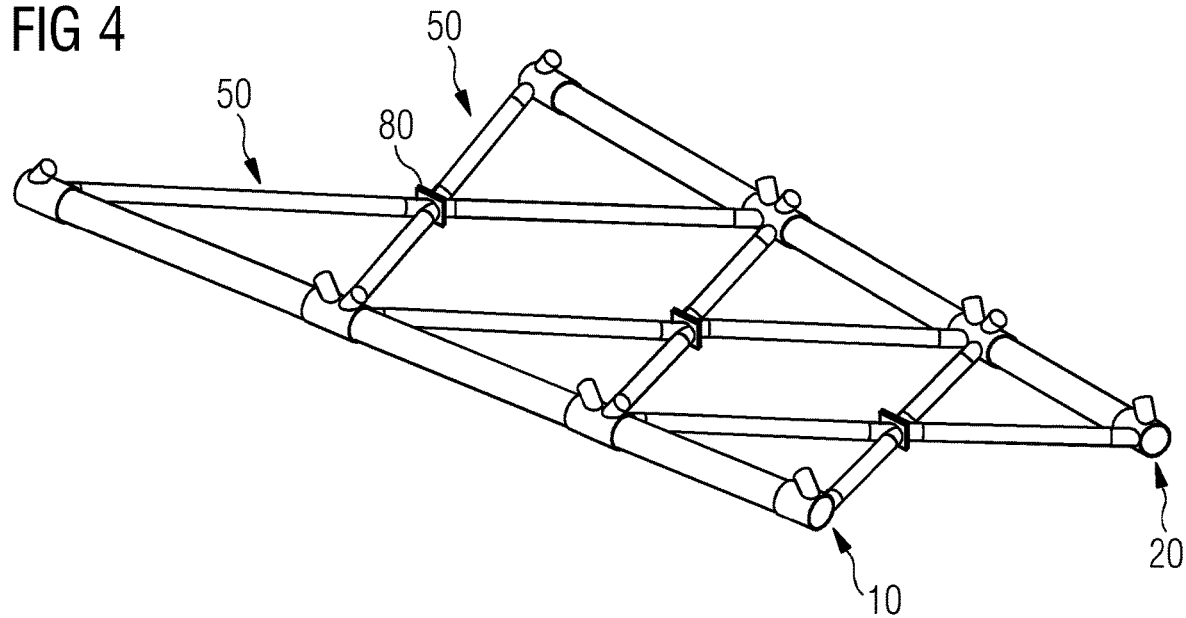
FIG. 4 is a schematic drawing showing the two components of FIG. 2 in an assembled state.

The first and second components are mounted to each other in step S2 of the method of FIG. 13 by joining the parts 60 and 70 of the brace cross nodes of the opposing pairs of brace structures, thereby forming respective full brace cross nodes 80 as shown in FIG. 4. The components 10 and 20 are thus mounted together in a fast, easy and secure manner.

Figure 5:
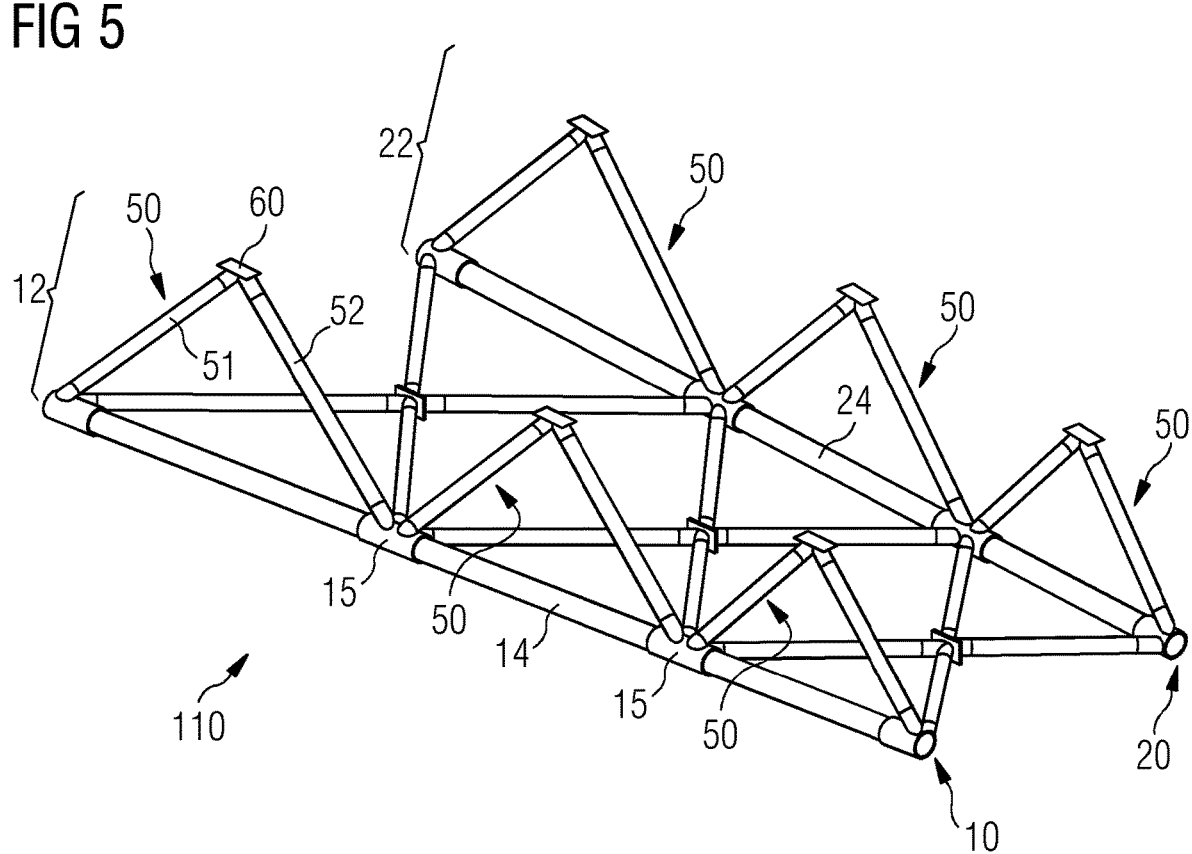
FIG. 5 is a schematic drawing showing the assembled components of FIG. 2 to which further brace structures have been mounted.

In a next step S3, further brace structures are mounted to the first leg 14 and the second leg 24 of the first and second components 10, 20. As shown in FIG. 5, these further brace structures 50 have a configuration corresponding to the brace structures of the first and second sets 11, 21. In the example of FIG. 5, these brace structures extend from their respective leg substantially vertically and thus form a third set 12 of brace structures of the first component 10 and a fourth set 22 of brace structures of the second component 20. The free ends of the respective brace structures (V-frames) are in particular welded to or otherwise attached to the double-K leg-brace nodes 15. It should be clear that the uppermost and lowermost leg-brace connection is not a double K-joint, but a double Y-joint.

Figure 6:
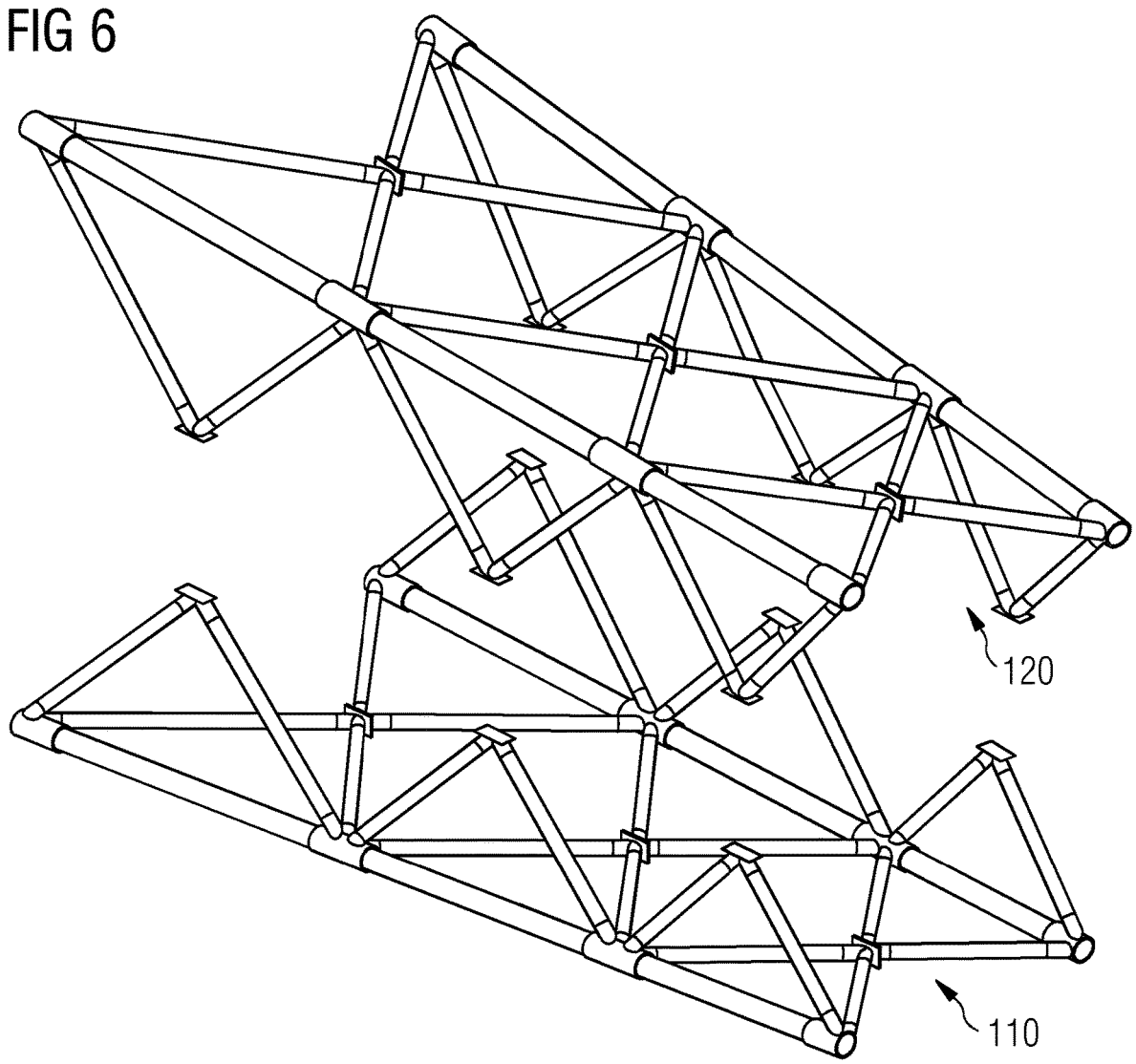
FIG. 6 is a schematic drawing showing the assembly of two halves of the jacket structure according to an embodiment of the invention.
Figure 7:
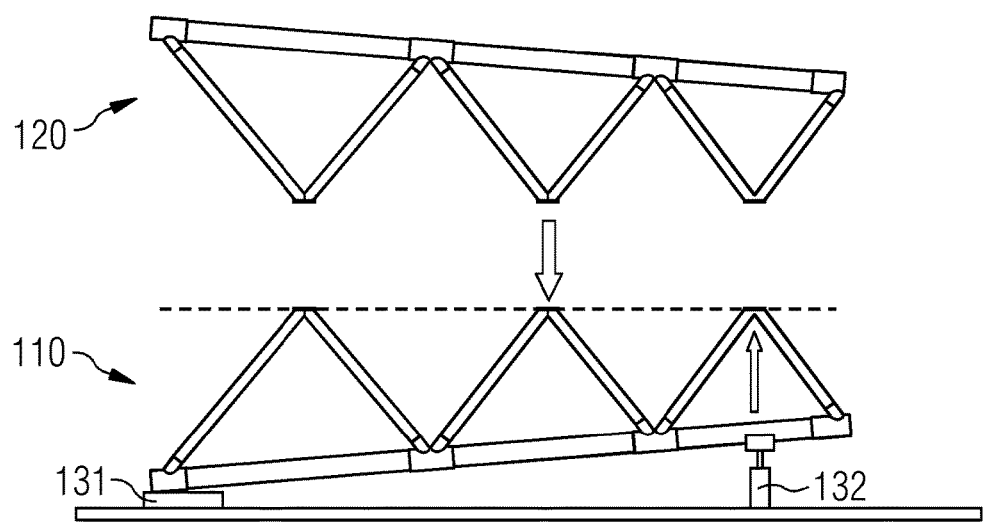
FIG. 7 is a schematic drawing showing the assembly of two halves of the jacket structure according to an embodiment of the invention.

By assembling the further brace structures 50 to the first and second legs 14, 24 in step S3, one half 110 of the jacket structure is formed (FIG. 5). A second half jacket structure 120 can be assembled in parallel. The second half may correspond to the first half in structure and may be assembled from the same components using the same method (step S4). The first and second halves 110, 120 are then assembled to form the full jacket structure 100 (FIG. 6). Prior to such assembly, the first half jacket 110 may be supported such that the free (unoccupied) split brace cross nodes 60, 70 are aligned substantially horizontally. As outlined above, the jacket structure may be tapered, so that it may need to be tilted to provide such horizontal alignment. This is shown in FIG. 7, where one end (the bottom end) of the half jacket 110 is supported by a support 131, and the other (upper) end of the half jacket 110 is supported by a second support 132 that is adjustable in height to achieve the desired horizontal alignment (step S5). Essentially, a flat landing of the second half jacket 120 can thus be achieved, as well as a constant height for the work personal which performs the joining operation between the two halves. Additional support for the second half 120 would otherwise be necessary as the second half 120 might slide off the first half 110 without additional support.

To effect the assembly, the second half jacket 120 is rotated and lifted in step S6, which may for example be performed by two small crawler cranes lifting the half jacket at bottom and top ends thereof. Alternatively, a single larger crawler crane may be used and an additional guiding system may be provided to control the positioning of the second half. In step S7, the second half jacket 120 is aligned above the first half jacket 110 such that the free half brace cross nodes of the first and second jacket halves face each other as shown in FIG. 6. The second jacket half 120 is then lowered onto the first jacket half 110 (step S8), as indicated by the arrow in FIG. 7. The first and second halves 60, 70 of the brace cross nodes on the respective jacket halves are then mounted together, e.g. by bolting or welding, to mount the second half 120 to the first half 110 and to thereby form an assembled jacket structure 100 (see FIG. 12).

The mounting of the first and second components in step S2 and the mounting of the further brace structures in step S3 can all occur on ground level without the need for work personnel to work at height. This enhances safety and facilitates assembly. Only the mounting of the two halves in step S9 is performed at height, yet only at a height corresponding to half the width of the jacket structure. This is a significant advantage over conventional assembly methods.

It is furthermore relatively easy to transport the components 10, 20 and the further pre-assembled brace structures (V-frames) to a transport site, as these components are relatively compact. Furthermore, since most parts are already assembled, and as it is not necessary to join for example four braces in a common node (which is difficult due to the required alignment), the assembly is also facilitated.

Variations to the assembly method are certainly conceivable. For example, the further brace structures 50 mounted in step S3 may be mounted to the components 10, 20 before joining them. Essentially, quarter jacket structures may thus be provided by components 10, 20. These may be pre-assembled and transported to a final assembly site.

Figure 8:
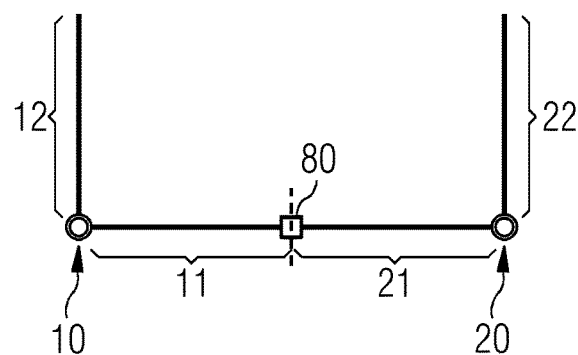
FIG. 8 is a first schematic drawing showing an assembly of four components, in particular four quarters, of the jacket structure according to an embodiment of the invention.
Figure 9:
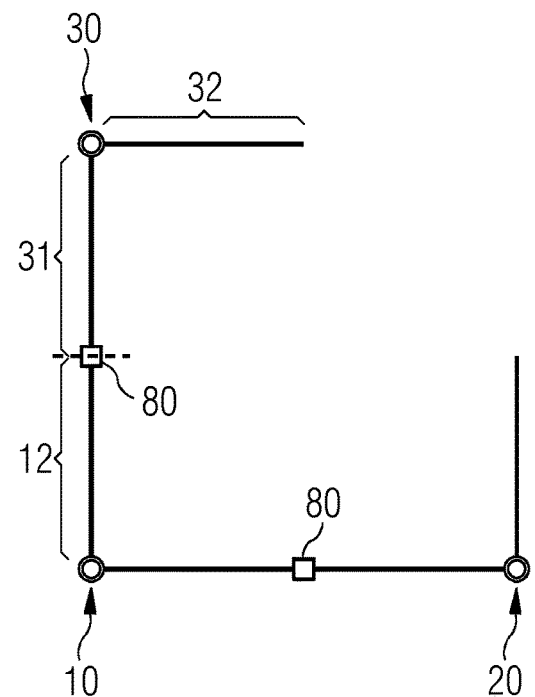
FIG. 9 is a second schematic drawing showing the assembly of four components, in particular four quarters, of the jacket structure according to an embodiment of the invention.

The jacket structure can be large and the weight of a half jacket may be in the range of 200 tons. As such weight may be too heavy for lifting by a crane, a variation of the assembly method is illustrated FIGS. 8 to 11. FIGS. 8 to 11 show sectional views taken perpendicular to the longitudinal extension of the jacket structure. The sets of brace structures 11, 12 of the first component 10 and the sets 21, 22 of the second component 20 are indicated in FIG. 8. The first and second components 10, 20 are in FIG. 8 in an assembled state as shown in FIG. 5. Furthermore, a third component 30 of the jacket structure is assembled, which corresponds to the first component 10 to which the further set 12 of frame structures has been mounted (i.e. it corresponds to a quarter of the jacket structure). This quarter component 30 of the jacket structure has only half the weight of the jacket half 120. Component 30 is lifted by a crane into alignment with component 10 so that the first and second parts of the brace cross nodes can be joined to each other to thereby mount the third component 30 to the first component 10. Again, full brace cross nodes 80 are thereby formed (FIG. 9). The half brace cross nodes of fifth set 31 are thus joined to the half brace cross nodes of set 12.

Figure 10:
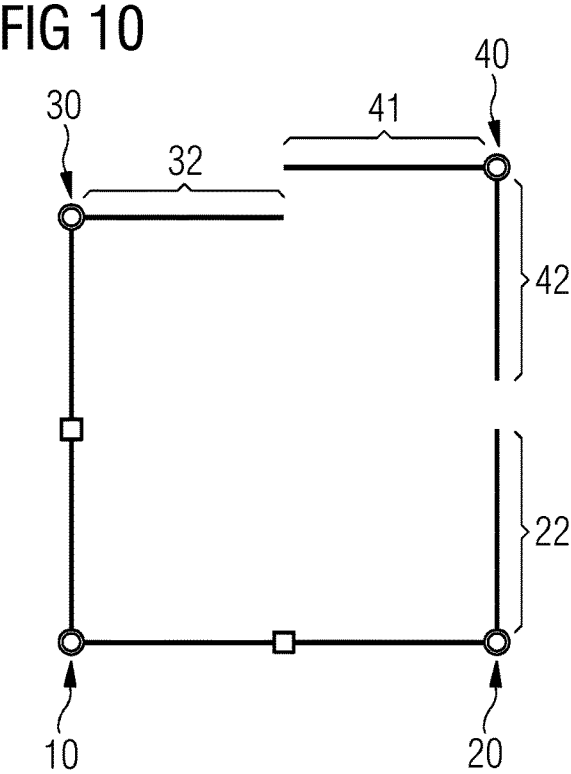
FIG. 10 is a third schematic drawing showing the assembly of four components, in particular four quarters, of the jacket structure according to an embodiment of the invention.
Figure 11:
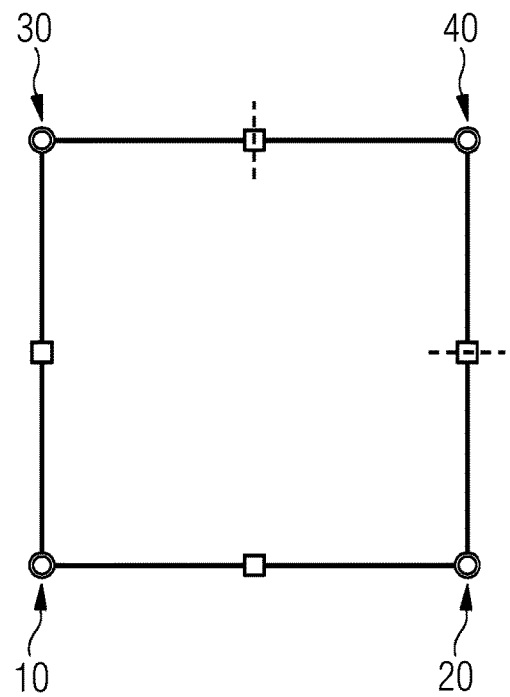
FIG. 11 is a fourth schematic drawing showing the assembly of four components, in particular four quarters, of the jacket structure according to an embodiment of the invention.

A fourth component 40 is provided (FIG. 10) which corresponds to the third component 30 and accordingly is a quarter of the jacket structure 100. The fourth component 10 includes a seventh set 41 of brace structures and a eight set 42 of brace structures. As shown in FIG. 10, the component 40 is lifted by a crane into alignment with the second component 20 and the third component 30. The component 40 is then lowered until the parts of the brace cross nodes of the second and fourth components 20, 40 that face each other meet. At the same time, the parts of the brace cross nodes of the fourth and third components meet. This position is shown in FIG. 11, and the meeting parts of the brace cross nodes are joined in order to mount the fourth component 40 to the second and third components 20, 30. In particular, the brace cross node parts of the sixth set 32 and the seventh set 41 are joined, and the brace cross node parts of the eighth set 42 and the fourth set 22 are joined.

Figure 12:
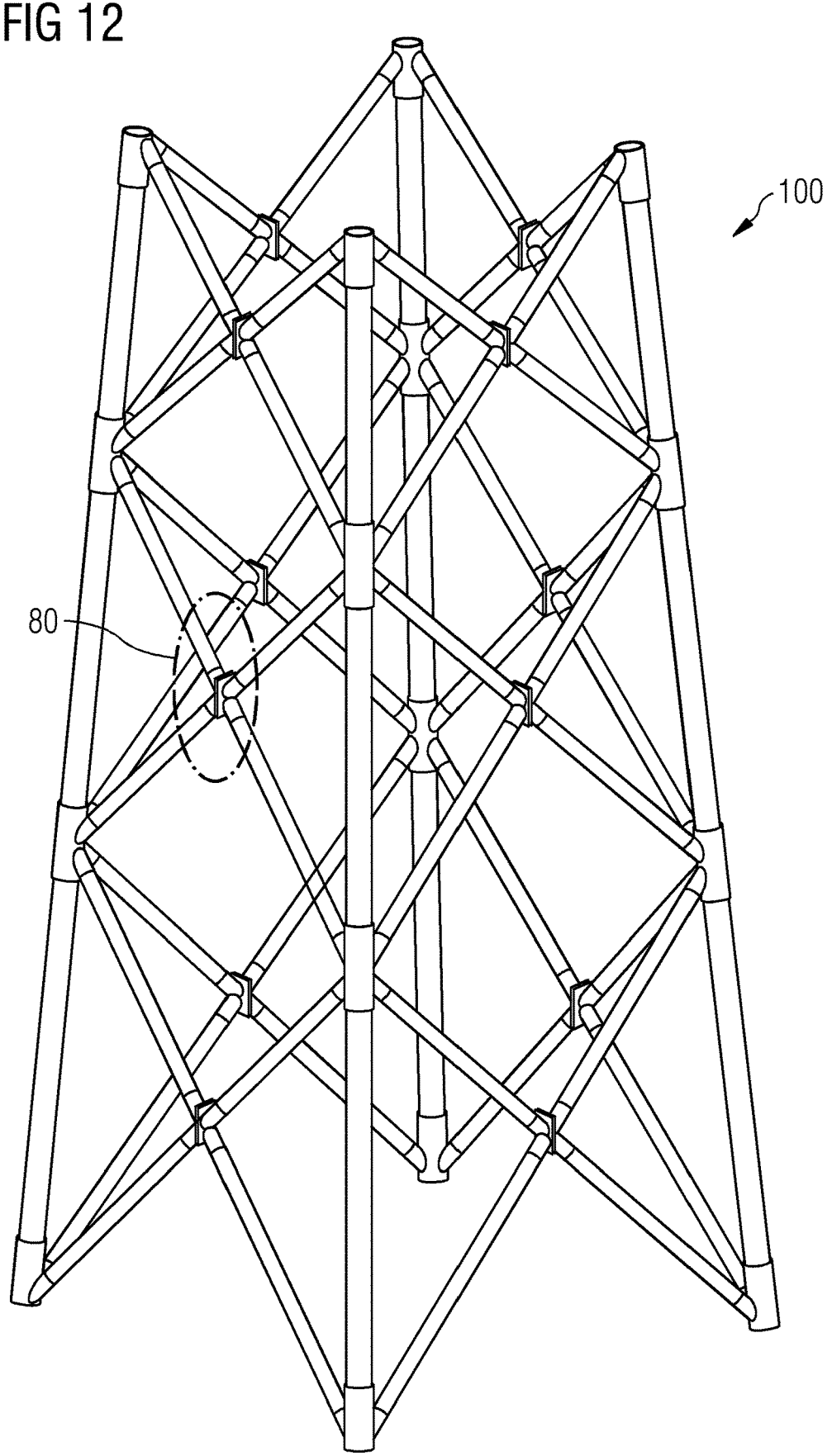
FIG. 12 is a schematic drawing showing an assembled jacket structure according to an embodiment of the invention.

An assembled jacket structure 100 is thereby formed and is shown in FIG. 12. In FIGS. 8 to 11, the dashed lines indicate where the opposing parts 60, 70 of brace cross nodes are mounted to each other to assemble the respective components 10, 20, 30 and 40 of the jacket structure. As can be seen in FIG. 11, assembly work has to be performed at a larger height, yet the assembly is still facilitated since only the parts 60, 70 of the brace cross nodes need to be joined to each other. Further, the weight that needs to be lifted is reduced significantly.

The brace structures (V-frames) can be pre-assembled and can include the part of the brace cross node, i.e. the split X-node. Transportation is thus facilitated. It is also possible to pre-assemble the components 10, 20 as shown in FIG. 2 including a respective set 11, 21 of brace structures. Such component is still relatively easy to transport. On the other hand, it is also possible to pre-assemble a component that corresponds to a quarter of the jacket structure and to transport such pre-assembled component. Final assembly can be facilitated this way. In any case, the mounting of such components to each other is facilitated by the split X-nodes and the safety for assembly workers is improved.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of assembling a jacket structure that includes two or more legs and a plurality of crossing braces extending between the two or more legs and forming cross joints, the method comprising:

providing a first component of the jacket structure that includes a first leg of the two or more legs and that further includes a first set of brace structures, wherein each brace structure includes a section of a first brace and a section of a second brace, the sections of the first brace and the second brace being at one end attached to the first leg at respective first and second leg-brace joints that are spaced apart, and the sections of the first brace and the second brace being at an other end joined to each other so as to form a first part of a brace cross node, the brace structure and the first leg thereby forming an A-frame;

providing a second component of the jacket structure that includes a second set of brace structures, wherein each brace structure of the second set includes at least a section of the first brace and a section of the second brace which are joined at one end so as to form a second part of the brace cross node; and mounting the first component of the jacket structure to the second component of the jacket structure by joining the first and second parts of the brace cross node to form full brace cross nodes, so that the sections of braces of the first set of brace structures and the sections of braces of the second set of brace structures form braces that cross at the respective brace cross node;

wherein the first part and the second part of the brace cross node each comprise a mounting element to which the respective ends of the brace sections of the first and second braces are attached, the mounting element of the first part comprising a plate having a first side and a second side opposite the first side, and the mounting element of the second part comprising a plate having a first side and a second side opposite the first side;

wherein the first part and the second part of the brace cross node further comprises a first connecting piece attached to the respective section of the first brace and a second connecting piece attached to the respective section of the second brace, wherein the first connecting piece and the second connecting piece of the first part extend in a V-shape from the first side of the mounting element of the first part, and the first connecting piece and the second connecting piece of the second part extend in a V-shape from the first side of the mounting element of the second part;

wherein the second side of the mounting element of the first part is a flat surface that faces opposite a direction that the first connecting piece and the second connecting piece of the first part extend, and the second side of the mounting element of the second part is a flat surface that faces opposite a direction that the first connecting piece and the second connecting piece of the second part extend, and, when the first part is joined to the second part to form the full brace cross node, the flat surface of the mounting element of the first part contacts the flat surface of the mounting element of the second part to form a flanged plate interface.

2. The method according to claim 1, wherein in the first set of brace structures and in the second set of brace structures, an angle of the sections of the first and second braces is such that when the first and second parts of the brace cross nodes are joined, brace sections lying on opposite sides of the respective brace cross node form a same angle with the first leg, and lie on a same straight line.

3. The method according to claim 1, wherein the first and second components of the jacket structure are joined while the first and second components are arranged substantially horizontally in a substantially horizontal plane.

4. The method according to claim 1, wherein the second component of the jacket structure includes a second of the two or more legs, wherein for each brace structure of the second set, the sections of the first and second braces are at a respective other end attached to the second leg at respective leg-brace joints that are spaced apart, the brace structure and the second leg thereby forming an A-frame.

5. The method according to claim 4, wherein the brace structures of the first and second sets extend in a same first plane, wherein the method further comprises mounting to the first leg a third set of brace structures extending in a second plane and/or mounting to the second leg a fourth set of brace structures extending in a third plane.

6. The method according to claim 5, wherein the first component and the second component of the jacket structure form a first half of the jacket structure, wherein the method further comprises:
providing a second half of the jacket structure that has a structure corresponding to a structure of the first half;
aligning the second half of the jacket structure with the first half such that the parts of brace cross nodes of the third and fourth sets of brace structures of the first half face corresponding parts of brace cross nodes of the second half; and
joining the facing parts of the brace cross nodes of the first and second halves to thereby mount the second half to the first half of the jacket structure.

7. The method according to claim 5, wherein the method further comprises:
providing a third component of the jacket structure, wherein the third component comprises at least a third of the two or more legs and further comprises a fifth set of brace structures extending from the third leg in a fourth plane;
aligning the third component such that the fifth set of brace structures is aligned with the third set of brace structures of the first component; and
joining the parts of brace cross nodes of the fifth and third sets of brace structures to mount the third component of the jacket structure to the first component of the jacket structure.

8. The method according to claim 7, wherein the third component comprises a sixth set of brace structures extending in a plane angled with respect to the fourth plane, wherein the method further comprises:
providing a fourth component of the jacket structure, wherein the fourth component comprises a fourth of the two or more legs and further comprises a seventh set of brace structures and further comprises an eighth set of brace structures;
aligning the fourth component such that the brace structures of the seventh set face the brace structures of the sixth set of the third component and that the brace structures of the eighth set face the brace structures of the fourth set of the second component; and
joining the parts of brace cross nodes of the facing brace structures to mount the fourth component of the jacket structure to the second and third components of the jacket structure.

9. A jacket structure component for forming a jacket structure that includes two or more legs and a plurality of crossing braces extending between the two or more legs and forming cross joints, the jacket structure component comprising:
a first of the two or more legs; and
a first set of brace structures, wherein each brace structure includes a section of a first brace and a section of a second brace, the sections of the first brace and the second brace being at one end attached to the first leg at respective first and second leg-brace joints that are spaced apart, and the sections of the first brace and the second brace being at an other end joined to each other so as to form a first part of a brace cross node, the brace structure and the first leg thereby forming an A-frame;
wherein the first part and a second part of the brace cross node each comprise a mounting element to which respective ends of the brace sections of the first and second braces are attached, the mounting element of the first part comprising a plate having a first side and a second side opposite the first side, and the mounting element of the second part comprising a plate having a first side and a second side opposite the first side;
wherein the first part and the second part of the brace cross node further comprises a first connecting piece attached to a respective section of the first brace and a second connecting piece attached to a respective section of the second brace, wherein the first connecting piece and the second connecting piece of the first part extend in a V-shape from the first side of the mounting element of the first part, and the first connecting piece and the second connecting piece of the second part extend in a V-shape from the first side of the mounting element of the second part;
wherein the second side of the mounting element of the first part is a flat surface that faces opposite a direction that the first connecting piece and the second connecting piece of the first part extend, and the second side of the mounting element of the second part is a flat surface that faces opposite a direction that the first connecting piece and the second connecting piece of the second part extend, and, when the first part is joined to the second part to form a full brace cross node, the flat surface of the mounting element of the first part contacts the flat surface of the mounting element of the second part to form a flanged plate interface.

10. The jacket structure component according to claim 9, wherein the jacket structure component further comprises a second set of the brace structures, wherein the brace structures of the first set lie in a first plane, and wherein the brace structures of the second set lie in a second plane, wherein the second plane is angled with respect to the first plane.

11. A jacket structure comprising at least two of the jacket structure components according to claim 9, wherein the jacket structure components are arranged such that the brace structures of the two or more jacket structure components face each other, and wherein the two or more jacket structure components are mounted to each other by joining the parts of the brace cross nodes of the facing brace structures to form the full brace cross nodes.

12. A wind turbine comprising: a support structure, wherein the support structure comprises the jacket structure according to claim 11.

* * * * *